(12) United States Patent
Krishnaswamy et al.

(10) Patent No.: US 6,391,456 B1
(45) Date of Patent: May 21, 2002

(54) THERMOPLASTIC COMPOSITE LUMBER HAVING REINFORCING LAMINATE OF UNIDIRECTIONAL FIBERS

(75) Inventors: Prabhat Krishnaswamy, Columbus; Duryodhan Mangaraj, Dublin, both of OH (US)

(73) Assignee: Engineering Mechanics Corporation of Columbus, Columbus, OH (US)

( * ) Notice: Subject to any disclaimer, the term of this patent is extended or adjusted under 35 U.S.C. 154(b) by 0 days.

(21) Appl. No.: 09/635,147

(22) Filed: Aug. 8, 2000

(51) Int. Cl.[7] ............................................. B32B 9/04
(52) U.S. Cl. .................. 428/411.1; 428/55; 428/56; 428/98; 428/113; 428/221; 428/421; 428/423.7; 428/903.3; 156/60; 156/172
(58) Field of Search ............................ 428/903.3, 56, 428/317.1, 68, 55, 411.1, 98, 113, 421, 114, 423.7, 221; 52/650.3, 309.1; 156/60, 62.2, 172, 166, 182, 185

(56) References Cited

U.S. PATENT DOCUMENTS

| | | | |
|---|---|---|---|
| 5,135,806 A | 8/1992 | Eiben et al. | 428/304.4 |
| 5,219,241 A | 6/1993 | Picton | 404/6 |
| 5,268,226 A | 12/1993 | Sweeney | 428/312.4 |
| 5,623,803 A | 4/1997 | Willis | 52/650.3 |
| 5,798,160 A | 8/1998 | Kohn | 428/56 |
| 5,850,720 A | 12/1998 | Willis | 52/650.3 |
| 5,916,932 A | * 6/1999 | Nosker et al. | 523/204 |
| 6,106,944 A | * 8/2000 | Heikkila | 428/397 |

* cited by examiner

*Primary Examiner*—Deborah Jones
*Assistant Examiner*—Abraham Bahta
(74) *Attorney, Agent, or Firm*—Standley & Gilcrest LLP

(57) ABSTRACT

A thermoplastic composite lumber product having at least one layer of a reinforcing laminate containing unidirectional fibers of glass, carbon or ceramics. The thermoplastic composite lumber of the present invention exhibits superior stiffness and strength compared to typical, non-reinforced plastic lumber.

59 Claims, 3 Drawing Sheets

| Specimen Type | Specimen Data | Depth in | Width in | Tangent Modulus psi | Flexural Strength psi | Max Strain % | Predicted Modulus psi |
|---|---|---|---|---|---|---|---|
| RPL | Average | 3.402 | 1.475 | 126,249 | 1300 | 2.022 | |
| Unreinforced | Std Dev | 0.010 | 0.006 | 16,469 | 64 | 0.013 | |
| ARPL with | Average | 3.744 | 1.480 | 573,314 | 1527 | 0.330 | 529201 |
| adhesive bond | Std Dev | 0.008 | 0.004 | 101,427 | 610 | 0.108 | 805 |
| ARLP with | Average | 3.755 | 1.475 | 506,843 | 3015 | 0.756 | 528098 |
| thermal weld | Std Dev | 0.011 | 0.009 | 59,580 | 1294 | 0.338 | 1062 |

Fig. 2

THERMOPLASTIC COMPOSITE LUMBER HAVING REINFORCING LAMINATE OF UNIDIRECTIONAL FIBERS

BACKGROUND AND SUMMARY OF THE INVENTION

Plastics are becoming increasingly used by the manufacturing industry. Plastics often provide benefits, such as decreased weight, reduced cost, and simplified manufacturing processes. As the amount of consumer generated solid waste continues to increase, the recyclabilty of plastics is also advantageous, as it is estimated that by volume, plastics may make up as much as one-quarter of all municipal solid waste. Therefore, the use of recycled plastics may assist in reducing the problem of municipal solid waste pollution. The use of plastics may also be beneficial in situations where a plastic material may be substituted for a material that is either non-renewable or of limited supply, such as timber. In addition, plastics are often resistant to moisture and insect damage, and may provide a substantially maintenance-free building material.

Because of these benefits, one of the more recent uses for plastic materials lies in the manufacture of plastic lumber products. Plastics, particularly high density polyethylene (HDPE) are being molded into increasingly popular products. For example, plastic lumber has recently become more widely used in the manufacture of picnic tables, park benches, patio furniture, and trash receptacles. However, because of the nature of its composition, plastic lumber made from HDPE, polyvinyl chloride (PVC), polypropylene (PP), or other polyolefins has thus far had insufficient stiffness and strength to allow its use in structural applications. This drawback may be even more pronounced when plastic lumber is manufactured from a wide variety of recycled mixed waste plastics rather than virgin resins.

The present invention addresses this deficiency by providing a plastic lumber product and method of manufacturing that may allow plastic lumber components to approach the stiffness and strength of natural wood lumber of similar dimensions. The present invention contemplates a composite product, whereby a plastic core is placed between one or more layers of a reinforced plastic laminate. For example, the plastic core may consist only of recycled HDPE or other polyolefins, may be a combination of HDPE commingled with other curbside collected plastics, or alternatively, may be made of virgin polyolefin resins.

It has been discovered that if a thin layer, or layers, of a reinforced plastic laminate is affixed to the plastic core, the stiffness and strength of the resulting plastic lumber component may be greatly increased. The reinforcing laminate may be attached to the plastic core via an adhesive, welding, or possibly by co-extrusion. It has also been determined that an inner, tying interlayer can be placed between the plastic core and the reinforcing laminate to further promote adhesion therebetween.

The present invention discloses composite plastic lumber components that may be used safely in a wider range of high performance applications possibly replacing wood, especially where exposure to moisture, insects and rotting may be a problem. For example, when manufactured according to the method of the present invention, such composite plastic lumber components may be utilized for joists, beams, stringers or other structural functions, and may be especially useful in the construction of decks, boardwalks and bridges in marine and waterfront applications.

BRIEF DESCRIPTION OF THE DRAWINGS

In addition to the novel features and advantages mentioned above, other objects and advantages of the present invention will be readily apparent from the following descriptions of the drawings and exemplary embodiments, wherein:

FIG. 2 is a table showing the results of load testing performed on sample specimens of a reinforced thermoplastic-composite lumber component of the present invention, and a comparison to a typical non-reinforced plastic lumber component.

DETAILED DESCRIPTION OF THE EMBODIMENT(S)

Figure 1:
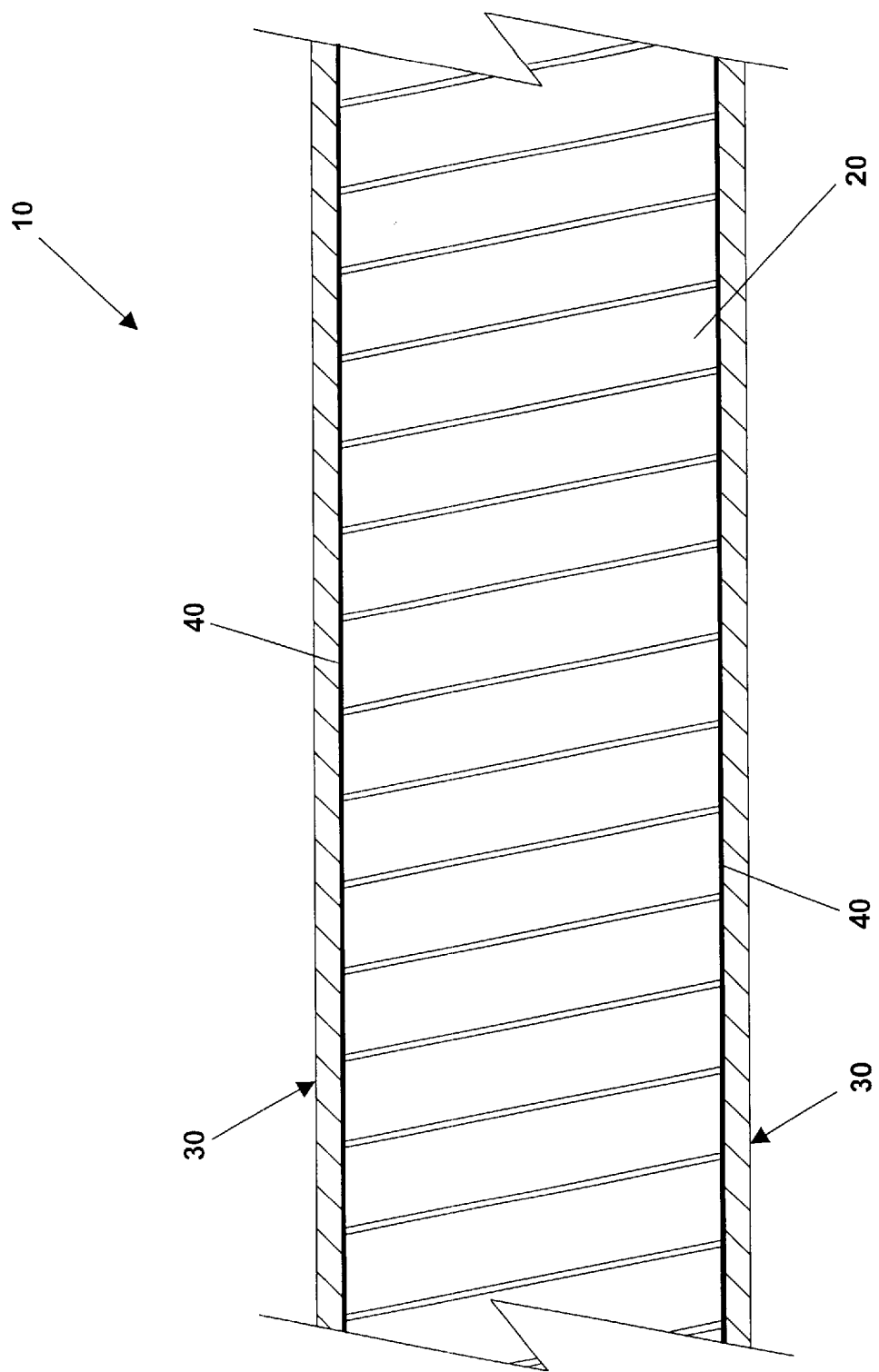
FIG. 1 is a lateral view, in cross-section, showing the construction of an embodiment of a reinforced thermoplastic-composite lumber component of the present invention.

An embodiment of a reinforced thermoplastic-composite lumber component 10 of the present invention is shown in FIG. 1. The reinforced thermoplastic-composite lumber component 10 has a plastic core 20, preferably comprised of high density polyethylene (HDPE), or a mixture of HDPE and other plastics commonly found at the curbside for collection and available for recycling. HDPE is typically used in the manufacture of plastic milk cartons and similar containers for holding consumable products, and therefore, is generally procurable in abundance. Alternatively, virgin polyolefins may also be used to manufacture the plastic core 20.

Although HDPE has been found to be a good material for manufacturing plastic lumber, the physical properties of HDPE and other consumer plastics which may find their way into the end product are such that known plastic lumber cannot safely be used in structural load-bearing applications. These non-reinforced plastic lumber products typically have a flexural modulus of only one-fifth to one-third that of wood.

It has been found, however, that by affixing a reinforcing laminate 30 to the plastic core 20, the stiffness and strength of the resulting reinforced thermoplastic-composite lumber component 10 can be increased significantly. Although it is preferred that the reinforcing laminate 30 be affixed to opposite sides of the plastic core 20, it may also be possible to effect a useful improvement in stiffness and strength by joining the reinforcing laminate to only one side thereof.

While it may be possible to utilize a variety of materials for the reinforcing laminate 30, it is preferable for purposes of bonding that the laminate material have a polymer matrix that is compatible with polyolefins such as HDPE. Therefore, it is most preferable that the laminate material have, for example, polypropylene (PP) or HDPE as the matrix resin. It is also preferable that the laminate material be reinforced, such as with fibers of glass, carbon or ceramic. The thickness of the reinforcing laminate 30 may vary depending on the intended application of the resulting reinforced thermoplastic-composite lumber component 10. However, good results have been obtained using a reinforcing laminate 30 thickness of between approximately 0.125 and 0.5 inches, and more approximately between 0.15 and 0.3 inches. Multiple layers of reinforcing laminate 30 may be used on a single plastic core 20, and multiple reinforced thermoplastic-composite lumber components 10 may be utilized to achieve the desired stiffness and strength.

One particular laminate material that has been found to give good results is a PH 10420 class, fiberglass reinforced thermoplastic laminate available from AZDEL, Inc., a joint venture between General Electric Co. and PPG Industries in Shelby, N.C. The AZDEL material combines long, continuous, unidirectional glass fibers with a polypropylene matrix to provide a reinforcing material with high stiffness and strength.

Once a material is selected, the reinforcing laminate 30 must be bonded to the plastic core 20 to form the reinforced thermoplastic-composite lumber component 10. Even though HDPE and polypropylene are both thermoplastic resins, it is difficult to bond polypropylene, or most other plastics to HDPE. In addition, because the glass fibers in the reinforcing laminate 30 generally have inherently hydrophilic surface characteristics, while the surface of the plastic (HDPE) core 20 is inherently hydrophobic, the two surfaces likely are not be capable of establishing a sufficiently strong bond. As such, a bonding method must be utilized that will ensure that the plastic core 20 and the reinforcing laminate 30 have adequate bond strength.

In one method of attachment, a specialized structural adhesive capable of bonding together such plastics may be placed between the plastic core 20 and the reinforcing laminate 30 and cured under heat and pressure until a stable bond is obtained. The Scotch-Weld™ Structural Plastic Adhesive DP-8005, available from 3M Corporation in St. Paul, Minn., works well for this purpose, although other adhesives may also provide adequate bonding. Approximately a 2 mil thickness of this adhesive on each of the surfaces to be bonded has shown to provide a sufficient tying layer to effectuate the joining of the plastic core 20 and the reinforcing laminate 30. Additionally, selected hot-melt adhesives having melting temperatures similar to that of the plastic core 20 material can also be used to bond the plastic core to the reinforcing laminate 30.

More preferably, however, the reinforcing laminate 30 may be bonded to the plastic core 20 by welding, preferably employing a tying interlayer 40 of material therebetween. The tying interlayer 40 may consist of a thermoplastic or a thermoplastic elastomer. Ethylene acrylic acid copolymer is an example of an acceptable thermoplastic tying interlayer. An example of a thermoplastic elastomer material that has produced good bonding when used as a tying interlayer is available from the Shell Chemical Company in Houston, Tex., under the tradename Kraton®. It appears, however, that a thermoplastic material, such as ethylene acrylic acid copolymer, may provide better adhesion between the plastic core 20 and the reinforcing laminate 30 than will a thermoplastic elastomer. Therefore, this type of material is preferably used for the tying interlayer 40. An example of an acceptable ethylene acrylic acid copolymer tying material is Primacor® 1321 from Dow Chemical in Midland, Mich.

Examples of other acceptable thermoplastic and thermoplastic elastomeric materials may include ethylene-methacrylate acid copolymer, ethylene-acrylate copolymer, ethylene-methacrylate copolymer, or maleated ethylene-propylene diene copolymer. The selected material should preferably have a polyalkene backbone with polar side groups in order to promote good interfacial compatibilizing properties.

Although various forms of plastic welding may be utilized to join the plastic core 20 and the reinforcing laminate 30, thermal welding is preferably employed. Different methods of thermal welding may be used, provided they can produce material temperatures adequate to effectuate bonding. For purposes of illustration and not limitation, these thermal welding methods may include hot-plate heating, infrared (IR) heating, through transmission infrared (TTIR) heating, and hot gas thermal welding. Infrared heating, in particular, has been found to produce very good results.

To better effectuate bonding, a film of tying interlayer material is preferably placed between the plastic core 20 and the reinforcing laminate 30 prior to welding. The tying interlayer 40 may be affixed by heating to the mating surface of each of the plastic core 20 and the reinforcing laminate 30 to effectuate bonding. During this process, each of the mating surfaces is heated to a temperature of approximately 150° C., or a temperature which will produce a sufficient melting of the respective surface layers. Preferably, heating occurs so that melting of the surface layers takes place without exposing the glass fibers of the reinforcing laminate 30. After the surfaces and tying interlayer 40 are sufficiently melted, the plastic core 20 and the reinforcing laminate 30 are assembled, preferably under pressure such as by clamping.

After clamping, heat is preferably applied to the joint so that the interface between the plastic core 20 and the reinforcing laminate 30 is welded together. The composite assembly of the plastic core 20, reinforcing laminate 30, and tying interlayer 40 are then held together under pressure and allowed to cool until the assembly reaches approximately room temperature. Bonding in this manner has been shown to give significantly better results than boding through the use of an adhesive, as discussed above.

It is also contemplated that the reinforced thermoplastic-composite lumber component 10 of the present invention may be produced by co-extrusion. For example, a tying interlayer 40 may be co-extruded onto the plastic core 20 or the reinforcing laminate 30 during processing. All three materials may then be forced into mating contact and held under pressure to form the reinforced thermoplastic-composite lumber component 10 of the present invention. The co-extrusion of a middle layer between two outer layers is known in the art and may be applied hereto.

Reinforced thermoplastic-composite lumber components 10 of various size may be produced according to the present invention. Reinforced thermoplastic-composite lumber components 10 according to the present invention may be manufactured to have traditional structural dimensions, such as, for example, 2×4, 2×6 or 3×12 inches. Sizes may also be selected so as to provide the same or similar stiffness and strength as a wooden board of a particular dimension. However, the above are merely examples, and practically any size may be produced within the limits of available manufacturing equipment and technology.

EXAMPLE

The following is one example amply illustrating the improved stiffness and strength of a reinforced thermoplastic-composite lumber component 10 of the present invention, in comparison to a typical non-reinforced plastic lumber component. In the following example, all of the plastic lumber specimens were manufactured to correspond approximately to the dimensions of a typical 2×4 inch wooden board. More exact dimensions may be found in the table of FIG. 2.

Three groups of five specimens each were produced for testing. The first group consisted of typical, non-reinforced, recycled plastic (HDPE) lumber specimens. The second group was made up of reinforced thermoplastic composite lumber specimens, manufactured according to the present invention by using a reinforcing laminate 30 bonded to a plastic core 20 via a structural plastic adhesive. The third group comprised reinforced thermoplastic composite lumber specimens, manufactured according to the present invention by utilizing a reinforcing laminate 30 bonded to a plastic core 20 via thermal welding with a tying interlayer 40. The core 20 of each specimen in groups 2 and 3, and the whole of each specimen in group 1 were all manufactured from the same mix of recycled HDPE and common, post-consumer curbside plastics.

Load testing was performed on each of the specimens according to ASTM D 6109-97, entitled *Standard Test Method for Flexural Properties of Unreinforced and Reinforced Plastic Lumber*. The results of the load testing were used to determine the average maximum stress, maximum strain, tangent modulus and flexural strength of each group of specimens.

Figure 3:
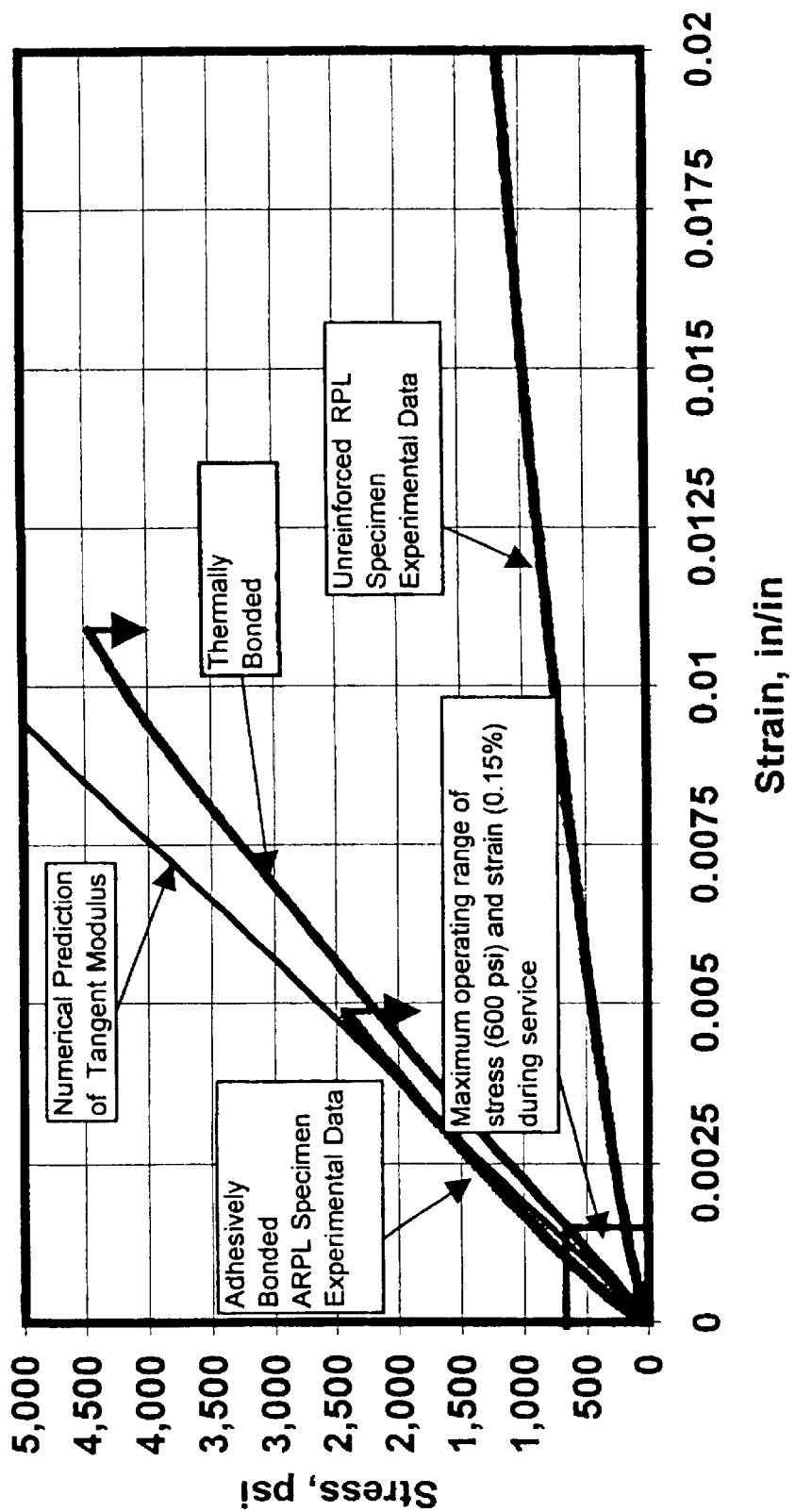
FIG. 3 is a stress/strain curve showing the improvement in stiffness and strength of a reinforced thermoplastic-composite lumber component of the present invention in comparison to a typical non-reinforced plastic lumber component.

The results obtained from the load testing may be seen in the table of FIG. 2 and the stress/strain curve of FIG. 3. The testing proves that both the adhesive bonded and thermally welded reinforced thermoplastic-composite lumber components 10 of the present invention have a much greater stiffness and strength than the typical, non-reinforced specimens, with the thermal welded specimens being the most superior. By reference to FIG. 2, it can be seen that the average tangent modulus (or stiffness) for the reinforced specimens exceeds 500,000 psi, while the average tangent modulus for the non-reinforced specimens is only 126,000 psi. Additionally, the average flexural strength of the thermally welded, reinforced thermoplastic composite lumber specimens (Group 3) was in excess of twice that of the typical, non-reinforced specimens. It can be further observed by reference to FIG. 3, that the maximum strain at failure for the welded specimens was approximately 0.75%, as compared to approximately 0.33% for the adhesive bonded specimens.

The above example shows that a reinforced thermoplastic-composite lumber component 10 of the present invention has far superior mechanical and structural properties, such as stiffness and strength, as compared to a typical, non-reinforced plastic lumber component of similar shape and dimension. The stiffness and strength of a reinforced thermoplastic-composite lumber component 10 manufactured according to the present invention allows it to be used in load-bearing applications, which significantly increases its desirability. For example, it has been determined that a 2×6 inch reinforced thermoplastic-composite lumber component 10 of the present invention can safely be utilized as a joist or beam to span lengths in excess of 10 feet, and may therefore be useful in the construction of boardwalks, docks, decks or other structures. Variations in the thickness of the reinforcing laminate 30 and the reinforcing laminate material can produce reinforced thermoplastic-composite lumber components 10 that may be used in structural applications requiring a span of approximately 20 feet or more.

The present invention allows non-reinforced plastic lumber manufactured either from recycled curbside plastics, preferably HDPE, or from virgin resins to be converted into high-performance plastic lumber components that may safely be employed in structural, load-bearing applications. Plastic lumber manufactured from other polyolefins and their copolymers, or polyolefin alloys and their blends with non-olefinic polymers can be reinforced for structural applications using the present invention. The reinforced thermoplastic composite lumber components of the present invention may be especially useful in the construction of decks, boardwalks, platforms, docks, or other applications where a moisture resistant, insect resistant, maintenance-free structure is desired.

While certain embodiments of the present invention are described in detail above, the scope of the invention is not to be considered limited by such disclosure, and modifications are possible without departing from the spirit of the invention as evidenced by the following claims:

1. A composite plastic lumber component, comprising:
   a plastic core portion;
   at least one layer of reinforcing material attached to and extending longitudinally along at least one outside surface of said core portion, said at least one layer of reinforcing material containing continuous, unidirectional fibers of one or more materials; and
   a tying interlayer for promoting adhesion between said plastic core portion and said at least one layerof reinforcing material.

2. The composite plastic lumber component of claim 1, wherein said plastic core portion is manufactured from a high density polyethylene material.

3. The composite plastic lumber component of claim 2, wherein said high density polyethylene is a virgin material.

4. The composite plastic lumber component of claim 2, wherein said high density polyethylene is a recycled material.

5. The composite plastic lumber component of claim 1, wherein said plastic core portion is manufactured from a high density polyethylene material commingled with other recyclable plastics.

6. The composite plastic lumber component of claim 1, wherein said plastic core portion is manufactured from a material selected from the group consisting of polyolefins other than high density polyethylene, polyolefin alloys, polyolefin blends, wood-flour filled polyolefins, natural agri-fiber filled polyolefins, fiberglass filled polyolefins, mineral filled polyolefins, wood-flour filled polyvinyl chloride composites, natural agri-fiber filled polyvinyl chloride composites, fiberglass filled polyvinyl chloride composites, and mineral filled polyvinyl chloride composites.

7. The composite plastic lumber component of claim 1, wherein said at least one layer of reinforcing material is placed on opposing sides of said plastic core portion.

8. The composite plastic lumber component of claim 1, wherein said at least one layer of reinforcing material is a reinforced plastic laminate.

9. The composite plastic lumber component of claim 8, wherein said plastic is polypropylene.

10. The composite plastic lumber component of claim 8, wherein said at least one layer of reinforcing material contains one or more types of fibers selected from the group consisting of glass, carbon and ceramics.

11. The composite plastic lumber component of claim 1, wherein said tying interlayer is an adhesive.

12. The composite plastic lumber component of claim 1, wherein said at least one layer of reinforcing material is bonded to said plastic core portion by welding.

13. The composite plastic lumber component of claim 12, wherein said welding is thermal welding.

14. The composite plastic lumber component of claim 12, wherein said tying interlayer is placed between said core portion and said at least one layer of reinforcing material.

15. The composite plastic lumber component of claim 12, wherein said tying interlayer is a thermoplastic.

16. The composite plastic lumber component of claim 12, wherein said tying interlayer is a thermoplastic elastomer.

17. The composite plastic lumber component of claim 12, wherein said tying interlayer is selected from the group consisting of ethylene acrylic acid copolymer, ethylene methacrylic acid copolymer, ethylene maleic anhydride copolymer, propylene maleic anhydride copolymer, ethylene acrylate copolymer, ethylene methacrylate copolymer, and ethylene vinyl acetate copolymer.

18. The composite plastic lumber component of claim 12, wherein said tying interlayer is selected from the group consisting of acrylic acid anhydride grafted polyolefin copolymer and maleic anhydride grafted polyolefin copolymer.

19. The composite plastic lumber component of claim 1, wherein said at least one layer of reinforcing material is co-extruded with said plastic core portion.

20. The composite plastic lumber component of claim 19, wherein said tying interlayer is co-extruded between said plastic core portion and said at least one layer of reinforcing material.

21. The composite plastic lumber component of claim 20, wherein said tying interlayer is a thermoplastic.

22. The composite plastic lumber component of claim 20, wherein said tying interlayer is a thermoplastic elastomer.

23. The composite plastic lumber component of claim 20, wherein said tying interlayer is selected from the group consisting of ethylene acrylic acid copolymer, ethylene methacrylic acid copolymer, ethylene maleic anhydride copolymer, propylene maleic anhydride copolymer, ethylene acrylate copolymer, ethylene methacrylate copolymer, and ethylene vinyl acetate copolymer.

24. The composite plastic lumber component of claim 20, wherein said tying interlayer is selected from the group consisting of acrylic acid anhydride grafted polyolefin copolymer and maleic anhydride grafted polyolefin copolymer.

25. A reinforced thermoplastic composite lumber component, comprising:
   a thermoplastic core portion;
   at least one layer of reinforced plastic laminate attached to and extending longitudinally along at least one side of said thermoplastic core portion, said at least one layer of reinforcing plastic laminate containing continuous, uni-directional fibers of one or more materials; and
   at least one interlayer of tying material, said tying material located between said reinforced plastic laminate and said thermoplastic core portion for promoting adhesion therebetween.

26. The reinforced thermoplastic composite lumber component of claim 25, wherein said thermoplastic core portion is manufactured from a high density polyethylene material.

27. The reinforced thermoplastic composite lumber component of claim 26, wherein said high density polyethylene is a virgin material.

28. The reinforced thermoplastic composite lumber component of claim 26, wherein said high density polyethylene is a recycled material.

29. The reinforced thermoplastic composite lumber component of claim 25, wherein said thermoplastic core portion is manufactured from a high density polyethylene material commingled with other recyclable plastics.

30. The reinforced thermoplastic composite lumber component of claim 25, wherein said thermoplastic core portion is manufactured from a material selected from the group consisting of polyolefins other than high density polyethylene, polyolefin alloys, polyolefin blends, wood-flour filled polyolefins, natural agri-fiber filled polyolefins, fiberglass filled polyolefins, mineral filled polyolefins, wood-flour filled polyvinyl chloride composites, natural agri-fiber filled polyvinyl chloride composites, fiberglass filled polyvinyl chloride composites, and mineral filled polyvinyl chloride composites.

31. The reinforced thermoplastic composite lumber component of claim 25, wherein said at least one layer of reinforced plastic laminate is placed on opposing sides of said thermoplastic core portion.

32. The reinforced thermoplastic composite lumber component of claim 25, wherein the plastic matrix in said reinforced plastic laminate is selected from the group consisting of polypropylene and polypropylene alloy.

33. The reinforced thermoplastic composite lumber component of claim 25, wherein said reinforced plastic laminate contains fibers selected from one or more of the groups consisting of glass, carbon and ceramics.

34. The reinforced thermoplastic composite lumber component of claim 25, wherein said at least one layer of reinforced plastic laminate is bonded to said thermoplastic core portion by welding.

35. The reinforced thermoplastic composite lumber component of claim 34, wherein said welding is thermal welding.

36. The reinforced thermoplastic composite lumber component of claim 34, wherein said at least one interlayer of tying material is a thermoplastic.

37. The reinforced thermoplastic composite lumber component of claim 34, wherein said at least one interlayer of tying material is a thermoplastic elastomer.

38. The reinforced thermoplastic composite lumber component of claim 34, wherein said at least one interlayer of tying material is selected from the group consisting of ethylene acrylic acid copolymer, ethylene methacrylic acid copolymer, ethylene maleic anhydride copolymer, propylene maleic anhydride copolymer, ethylene acrylate copolymer, ethylene methacrylate copolymer, and ethylene vinyl acetate copolymer.

39. The reinforced thermoplastic composite lumber component of claim 34, wherein said at least one interlayer of tying material is selected from the group consisting of acrylic acid anhydride grafted polyolefin copolymer and maleic anhydride grafted polyolefin copolymer.

40. The reinforced thermoplastic composite lumber component of claim 25, wherein said at least one layer of reinforced plastic laminate is co-extruded with said thermoplastic core portion.

41. The reinforced thermoplastic composite lumber component of claim 40, wherein said at least one interlayer of tying material is co-extruded between said thermoplastic plastic core portion and said at least one layer of reinforced plastic laminate.

42. The reinforced thermoplastic composite lumber component of claim 41, wherein said at least one interlayer of tying material is a thermoplastic.

43. The reinforced thermoplastic composite lumber component of claim 41, wherein said at least one interlayer of tying material is a thermoplastic elastomer.

44. The reinforced thermoplastic composite lumber component of claim 41, wherein said at least one interlayer of tying material is selected from the group consisting of ethylene acrylic acid copolymer, ethylene methacrylic acid copolymer, ethylene maleic anhydride copolymer, propylene maleic anhydride copolymer, ethylene acrylate copolymer, ethylene methacrylate copolymer, and ethylene vinyl acetate copolymer.

45. The reinforced thermoplastic composite lumber component of claim 41, wherein said at least one interlayer of tying material is selected from the group consisting of acrylic acid anhydride grafted polyolefin copolymer and maleic anhydride grafted polyolefin copolymer.

46. A method of producing a composite plastic lumber component, said method comprising:

provinding a plastic core portion;

providing at least one layer of reinforcing material having continuous, uni-directional glass fibers; and joining said at least one layer of reinforcing material to at least one side of said plastic core portion through the use of at least one interlayer of tying material.

47. The method of claim 46, wherein said plastic core portion is manufactured from a high density polyethylene material.

48. The method of claim 46, wherein said plastic core portion is manufactured from a high density polyethylene material commingled with other recyclable plastics.

49. The method of claim 46, wherein said plastic core portion is manufactured from a material selected from the group consisting of polyolefins other than high density polyethylene, polyolefin alloys, polyolefin blends, wood-flour filled polyolefins, natural agri-fiber filled polyolefins, fiberglass filled polyolefins, mineral filled polyolefins, wood-flour filled polyvinyl chloride composites, natural agri-fiber filled polyvinyl chloride composites, fiberglass filled polyvinyl chloride composites, and mineral filled polyvinyl chloride composites.

50. The method of claim 46, wherein said at least one layer of reinforcing material is placed on opposing sides of said plastic core portion.

51. The method of claim 46, wherein said at least one layer of reinforcing material is joined to said plastic core portion by an interlayer of tying material comprising an adhesive.

52. The method of claim 51, further comprising applying heat and pressure to at least one layer of reinforcing material and said plastic core portion after joining to facilitate an adequate bond.

53. The method of claim 46, wherein said at least one layer of reinforcing material is joined to said plastic core portion by welding.

54. The method of claim 53, wherein said welding is thermal welding.

55. The method of claim 53, wherein said at least one interlayer of tying material is selected from the group consisting of ethylene acrylic acid copolymer, ethylene methacrylic acid copolymer, ethylene maleic anhydride copolymer, propylene maleic anhydride copolymer, ethylene acrylate copolymer, ethylene methacrylate copolymer, and ethylene vinyl acetate copolymer.

56. The method of claim 53, wherein said plastic core portion, said at least one layer of reinforcing material, and said at least one interlayer of tying material are pressed together prior to welding.

57. The method of claim 53, further comprising heating one or more of said plastic core portion, said at least one layer of reinforcing material, and said at least one interlayer of tying material prior to causing said layers to come into contact.

58. The method of claim 46, wherein said at least one layer of reinforcing material is co-extruded with said plastic core portion.

59. The method of claim 58, wherein said at least one interlayer of tying material is co-extruded between said plastic core portion and said at least one layer of reinforcing material.

* * * * *

UNITED STATES PATENT AND TRADEMARK OFFICE
CERTIFICATE OF CORRECTION

PATENT NO. : 6,391,456 B1  Page 1 of 1
DATED : May 21, 2002
INVENTOR(S) : Krishnaswamy et al.

It is certified that error appears in the above-identified patent and that said Letters Patent is hereby corrected as shown below:

<u>Column 4,</u>
Line 13, please delete "C." and insert -- C --.

<u>Column 6,</u>
Between lines 8 and 9, please insert a line and insert -- What is claimed is: --.
Line 17, please delete "layerof" and insert -- layer of --.

Signed and Sealed this

Twenty-sixth Day of August, 2003

JAMES E. ROGAN
*Director of the United States Patent and Trademark Office*